W. AMREIN.
KAFIR CORN HARVESTER.
APPLICATION FILED APR. 28, 1914.
1,123,203.
Patented Dec. 29, 1914.
5 SHEETS—SHEET 4.
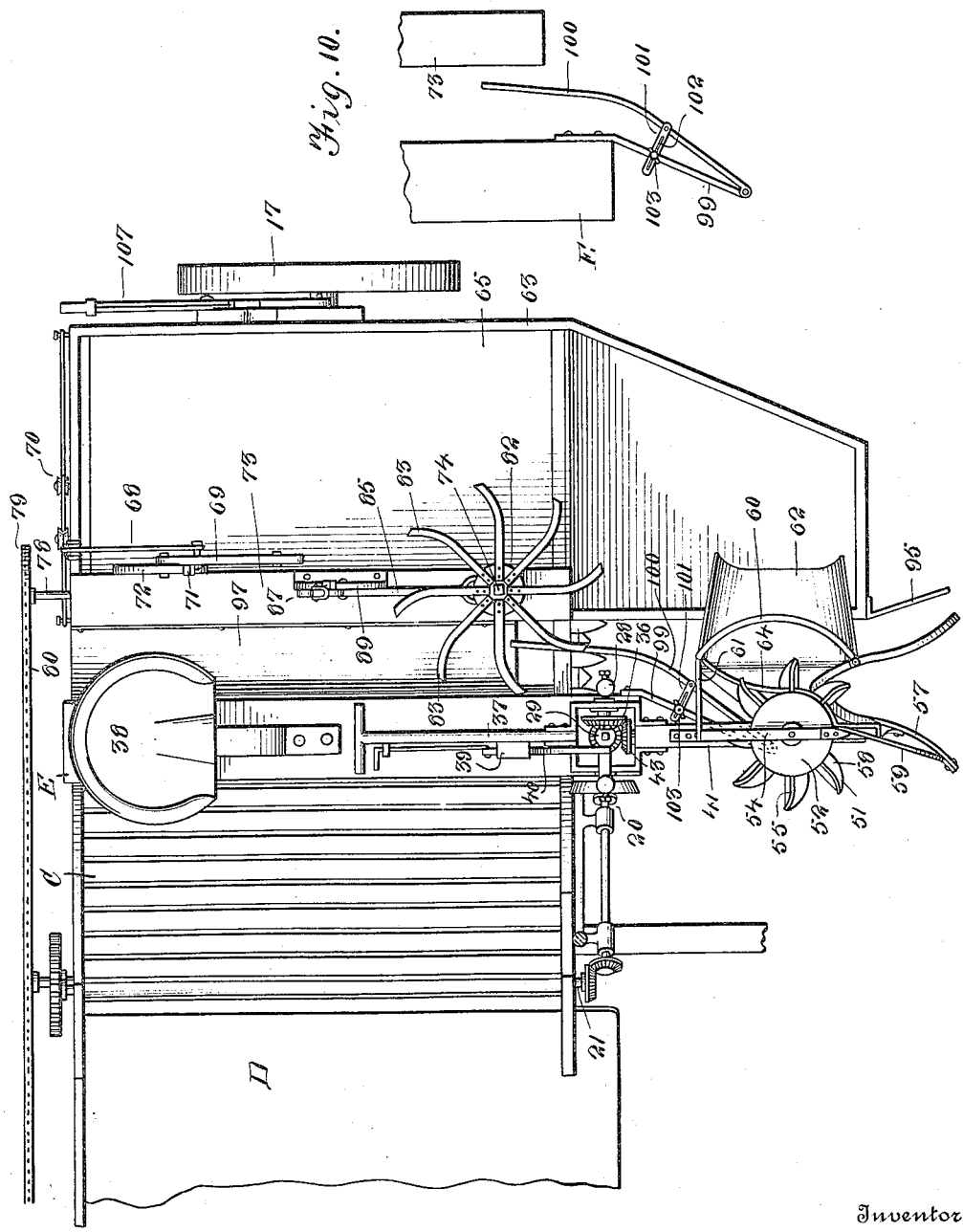
Inventor
William Amrein
By Victor J. Evans
Attorney
Witnesses

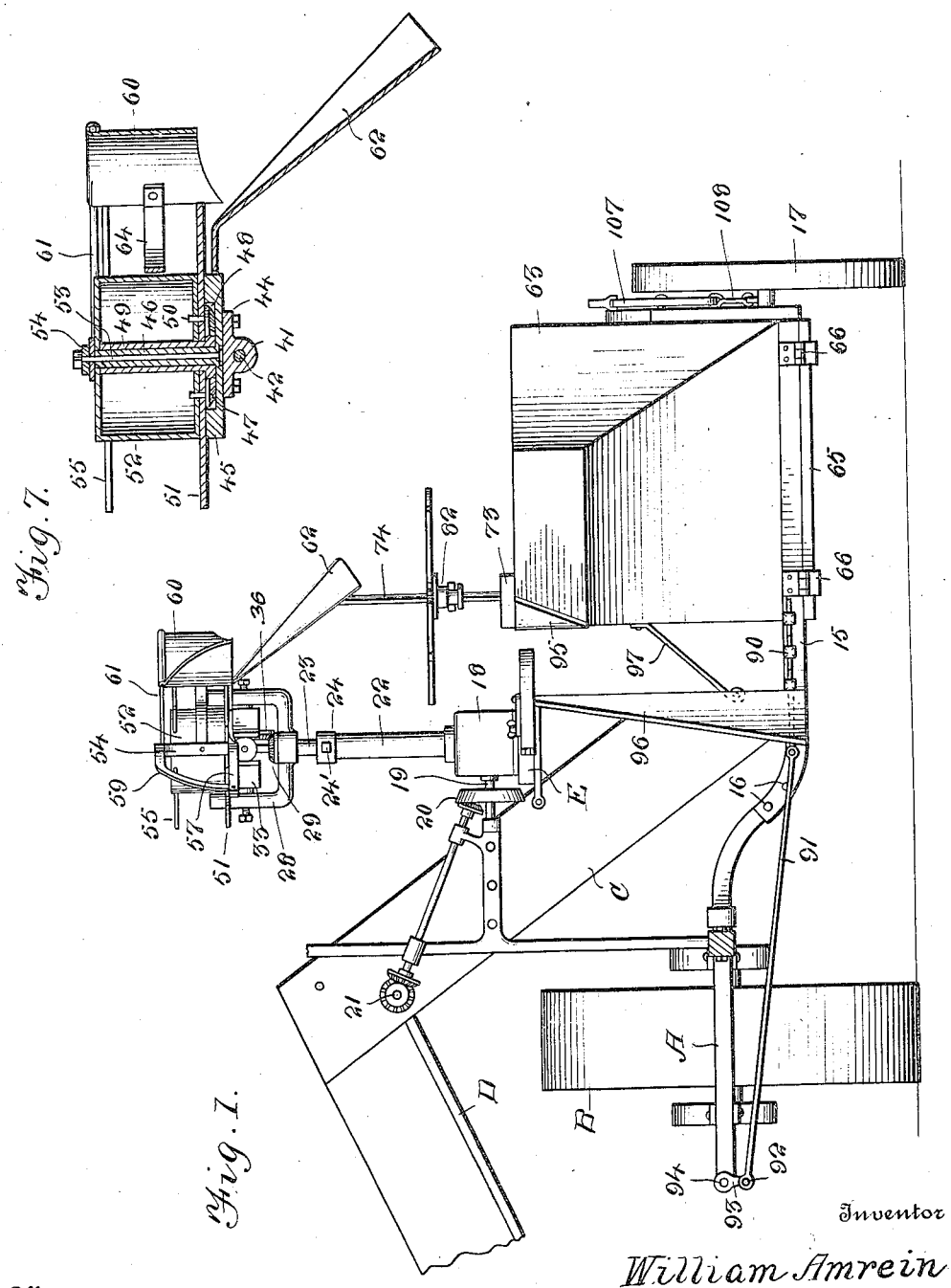

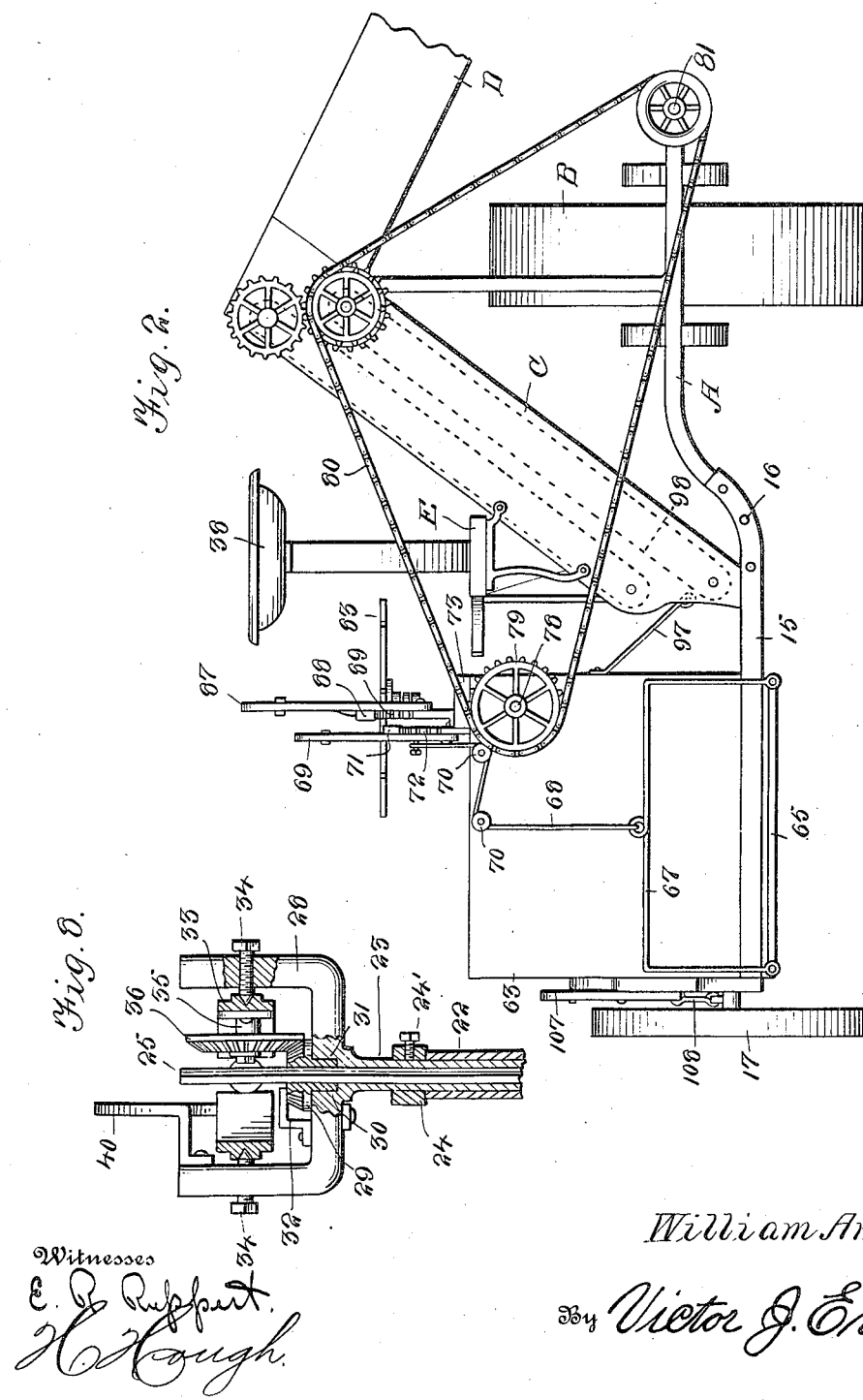

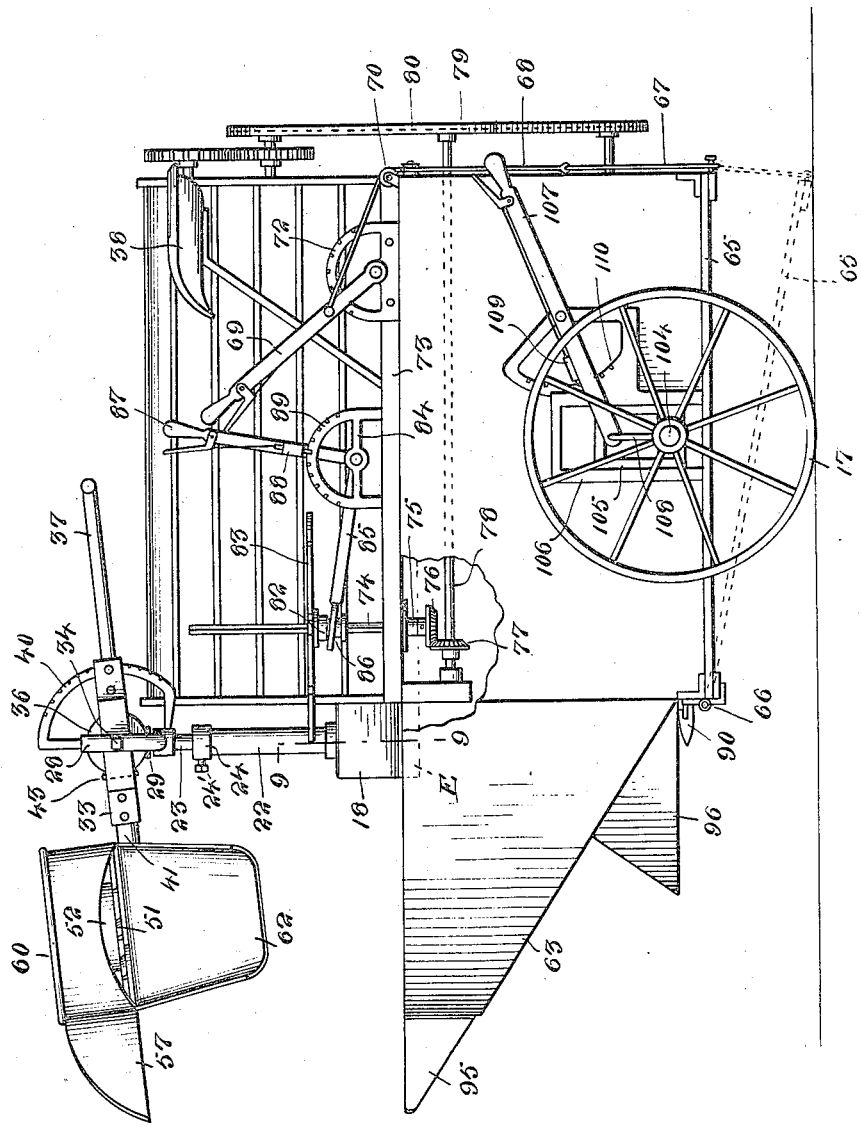

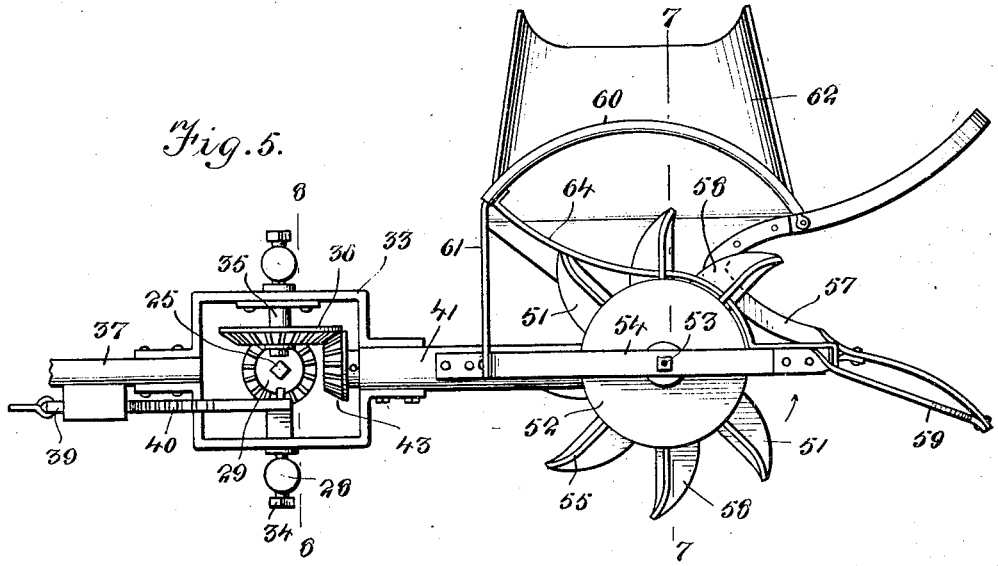
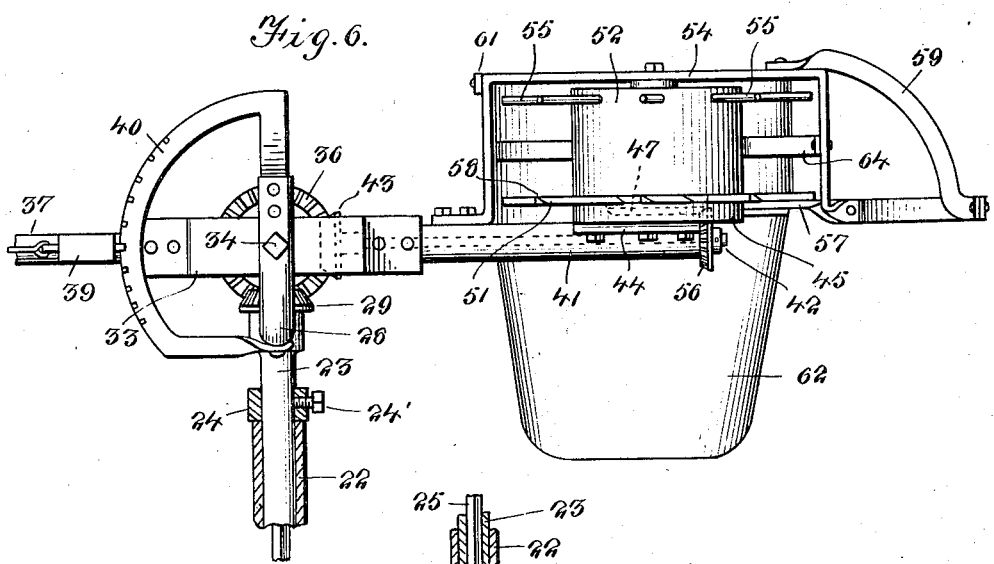
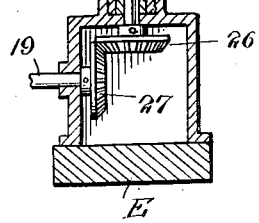

UNITED STATES PATENT OFFICE.

WILLIAM AMREIN, OF NOBLE, OKLAHOMA.

KAFIR-CORN HARVESTER.

1,123,203.

Specification of Letters Patent. Patented Dec. 29, 1914.

Application filed April 28, 1914. Serial No. 835,014.

*To all whom it may concern:*

Be it known that I, WILLIAM AMREIN, a citizen of the United States, residing at Noble, in the county of Cleveland and State of Oklahoma, have invented new and useful Improvements in Kafir-Corn Harvesters, of which the following is a specification.

This invention relates to machines for heading and cutting Kafir corn, maize, cane and the like, and it has for its principal object to produce a simple and efficient device which may be used in the nature of an attachment to an ordinary grain binding harvester, some parts of which will be removed to make room for the improved attachment.

A further object of the invention is to produce a corn heading and cutting attachment which may be attached to and operated as a part of an ordinary grain binding harvester and binder, the heading and cutting devices deriving motion from moving parts of the harvester and binder.

A further object of the invention is to produce a simple and improved attachment including a heading cutter which may be readily adjusted manually by the operator so as to operate efficiently upon stalks of varying height.

A further object of the invention is to simplify and improve the construction and arrangement of the heading cutter.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a front elevation showing a portion of a conventional grain binding harvester to which the improved device has been attached. Fig. 2 is a rear elevation of the same. Fig. 3 is a side elevation of the machine as seen from the grain side. Fig. 4 is a top plan view. Fig. 5 is a top plan view, enlarged, of the head cutting device and related parts. Fig. 6 is a side elevation of the same as seen from the stubble side. Fig. 7 is a sectional detail view taken on the line 7—7 in Fig. 5. Fig. 8 is a sectional detail view taken on the line 8—8 in Fig. 5. Fig. 9 is a sectional detail view taken on the line 9—9 in Fig. 3. Fig. 10 is a detail plan view of a stalk guide used in connection with the invention.

Corresponding parts in the several figures are denoted by like characters of reference.

The improved apparatus may be used in connection with any grain binding harvester of well known conventional form by removing from such machine the grain platform and the cutting apparatus.

In the drawings, A designates a portion of the binder frame, B, the bull wheel, C, the elevator, and D, the binder deck, all of which, with related parts, are left intact. The supporting frame 15 of the improved attachment may be detachably coupled to or connected with the frame structure A by means of bolts 16, and said frame is supported in part on a grain wheel 17 which replaces the customary grain wheel of the binder.

The frame structure A of the binder includes the foot board E on which is mounted a casing 18 affording bearings for a transverse shaft 19 which is mounted in a substantially horizontal plane and which derives motion through the medium of gearing 20 from a driven shaft 21 of the binder. The casing 18 supports a tubular post or upright 22 within which telescopes an extension tube 23, which latter may be secured rotatably at various adjustments by means of a set collar 24 and screw 24'. Supported for rotation axially within the tubular post 22 and its extension 23 is a shaft 25 having at its lower end a bevel gear 26 meshing with a bevel gear 27 on the shaft 19 from which motion will thus be transmitted to the shaft 25.

The tubular extension member 23 carries at its upper end a U-shaped yoke 28, best seen in Fig. 8, said yoke supporting a bevel pinion 29 which has been shown as being equipped with a collar 30 having a bearing in a socket 31 formed in the yoke. The shaft 25, which is of non-circular cross section extends through the pinion 29 with which it is slidably connected and which serves as a supporting and centering element for the upper end of the shaft, the lower end of which has a suitable bearing in the casing 18. A keeper 32, shown in Fig. 8, may be used when desired to prevent the bevel pinion 29 from jumping upwardly when the device is in operation.

It will be seen that by the construction set forth the tubular extension member 23 carrying the yoke 28 may be adjusted vertically by sliding it upwardly through the collar 24, which latter rests loosely on the upper end of the tubular post 22, and fastening it by means of the set screw 24'. It is obvious that the shaft 25 is to be made of proper length to permit any requisite adjustment. The yoke 28 supports a rocking frame 33, the latter being mounted for oscillation in a vertical plane on pivot screws 34 that are threaded through the limbs of the yoke 28. The rocking frame 33 affords a bearing for a stub shaft 35 carrying a bevel gear 36 meshing with the bevel pinion 29, it being evident that said gear and pinion will continue in mesh at any adjustment of the yoke 28. Connected with the rocking frame 33 and extending rearwardly therefrom is an arm or lever 37 that extends within convenient reach of the operator whose seat 38 is mounted in the usual manner on the binder frame. The lever 37 carries a stop member 39 engaging a rack segment 40 which is mounted upon and connected with the yoke 28 by means of which the rocking frame may be held securely at various inclinations to which it may be tilted. Connected with the rocking frame and extending forwardly with respect thereto is a tubular arm 41 through which extends a shaft 42 having at its rear end a bevel pinion 43 that is constantly in mesh with the bevel gear 36 from which the shaft 42 will thus derive motion when the machine is in operation, irrespective of the position of the yoke 28 and the rocking frame 33.

The tubular arm 41 has been shown, see Figs. 6 and 7, as being equipped with flanges 44 to support a base plate 45 which may be bolted upon or otherwise securely connected with said flanges. Extending upwardly from the base plate 45 is an axial bearing post 46 which has been shown as being of tubular form for the purpose of permitting of the passage of a bolt whereby certain operating members may be assembled, as will be presently shown. The base plate 45 supports a bevel gear 47 which may, as seen in Fig. 7, be seated in a recess 48 in said base plate, and which has been shown as being provided with a tubular collar 49 engaging the bearing post 46. The bevel gear 47 is operatively connected by pins 50 or equivalent connecting means with the cutting disk 51 and also with a drum 52, the parts being assembled together by means of a bolt 53 extending through the tubular bearing post 46, said bolt extending through a top bar 54 which serves in part to support various elements to be hereinafter described. The drum 52 is provided near its upper end with radial arms or beaters 55. The shaft 42 carries at its outer end a bevel pinion 56 which is constantly in mesh with the bevel gear 47, which latter with its related parts, including the cutting disk 51 and the drum 52, will thus be constantly driven when the machine is in operation.

The tubular arm 41 carries at its forward end a U-shaped guide 57 for the purpose of guiding the heads in the direction of the cutter 51, which latter, as shown, consists of a disk having radially disposed cutting teeth 58. The guide 57 has one of its limbs connected with the top bar 54 by means of a brace 59; the other limb of said guide is connected with one edge of an arcuate guard member 60, the other edge of which is connected with the bar 54 by means of a bracket member 61. Said bracket member also serves in part to support an inclined chute or duct 62 whereby the severed heads are guided downwardly and discharged to a box or receptacle 63 carried on the frame 15. A stripping member 64 is also provided, the same extending adjacent to the drum 52 and thence outwardly in the direction of the guard member 60, intermediate the cutter 51 and the arms or beaters 55, for the purpose of stripping from the cutter such of the severed heads as might have a tendency to adhere thereto.

It will be seen from the foregoing description that when the machine is in operation, constant rotary motion will be imparted to the cutter 51, irrespective of the relative positions of the yoke 28 and of the rocking frame 33. The latter frame may be readily tilted by means of the arm or lever 37 so as to enable corn of any height to be operated upon. Where the corn stalks are of even height, the rocking frame may be temporarily secured by means of the stop member 39 engaging the segment rack 40. By means of the lever 37 which, in operation, is grasped by the operator, the extension member 23 with its related parts, including the yoke 28 and the rocking frame 33, may be oscillated about its axis, thereby guiding the cutting apparatus, including the U-shaped guide 57 in an approximately horizontal plane so that the upper portions of the stalks will unfailingly be engaged by the guide 57. The necks of the incoming stalks, that is to say, the portions directly below the heads will be severed by the cutter 51, and the heads will drop on the chute 62, being thereby conveyed to the box or receptacle 63. The arcuate guard member 60 will prevent the heads from toppling over the chute 62 and being lost on the ground, while the stripping member 64 will disengage from the cutter any of the heads that exhibit a tendency to adhere.

The box or receptacle 63 has a bottom member 65 connected therewith by hinges 66 at its front edge; the rear end of said bottom member may be connected by a wire yoke 67 or in some other convenient manner with one end of a flexible lifting element 68, the other end of which i. connected with a lever 69, the intermediate portion of said flexible element being guided over guide elements, such as pulleys 70, so that by operating the lever 69, the rear end of the bottom member 65 may be elevated, and the bottom member thus be maintained in an obstructing position. In such position it may be retained by means of a stop member 71 on the lever 69 engaging a segment rack 72. The lever 69 is located within convenient reach of the operator who, by manipulating said lever, may permit the bottom member 65 to drop to an inclined position when the contents of the box or receptacle will be discharged, as will be readily understood.

The receptacle 63 has a shelf or bracket 73 supporting a vertical shaft 74 for which a suitable bearing 75 may be provided. Said shaft at its lower end has a bevel gear 76 meshing with a bevel gear 77 on a shaft 78 which extends longitudinally through the receptacle and which has at its rear end a sprocket wheel 79 receiving motion by means of a chain or link belt 80 from a driven shaft 81 of the binder, it being understood that any well known means for transmitting motion may be employed for the purpose of driving the shaft 74. The latter, which is of non-circular cross section, carries a slidable hub 82 which is rotatable therewith and which is equipped with a plurality of radially extending arms 83, constituting a reel which is adapted to engage and to operate upon the incoming stalks from which the heads have been removed. The bell crank lever which is fulcrumed on a stand 84 has a forwardly extending arm 85 which is terminally bifurcated to engage an annular groove 86 with which the hub 82 is provided so that by rocking the bell crank, the said hub may be raised or lowered with respect to the vertical shaft 74 on which it is mounted. The other arm of the bell crank constitutes a handle 87, and it has a stop member 88 adapted to engage a rack 89 which forms a part of the stand 84, and by means of which the reel element may be supported at various elevations.

For the purpose of severing the stalks at a suitable distance above the ground, a cutting apparatus is provided including a cutter bar 90 which is supported for reciprocation on the frame 15, said cutter bar being driven by means of a pitman 91, one end of which is connected with a wrist pin 92 on the crank 93 of a driven shaft 94. This cutting apparatus need not differ in any essential particular from the grain cutter usually employed in grain binding harvesters.

Obliquely disposed guides 95, 96 are mounted, respectively, on the box 63 and on the frame structure A of the binder for the purpose of guiding the incoming stalks to the cutting apparatus. Mounted on the inner side face of the box or receptacle 63 is an inclined shield or deflector 97 on which the severed stalks will be deposited by the action of the reel 82, said shield being so positioned that the stalks will be guided thereover on to the lower apron of the elevator or carrier, indicated in dotted lines in Fig. 2 at 98; the purpose being to avoid any possibility of the stalks being dropped below the elevator. By the elevator the stalks will be carried to the binding mechanism of the binder and will there be formed into bundles which are disposed of in the customary manner.

Mounted on the frame of the harvester, either directly on some portion of the frame structure A or, as seen in the drawings, on the foot board E, is a stalk guide consisting of an arm 99 which extends obliquely in a forward direction toward the cutter 51. Pivotally connected with the forward end of the arm 99 is a second arm 100 that extends obliquely in a rearward direction beneath the reel 82. The pivoted arm 100 is adjustably connected with the relatively stationary arm 99 by means of a link 101 having a slot 102 through which extends a bolt or fastening member 103 which also extends through the arm 99. It will be seen that by this guide member the stalks from which the heads are cut by the cutter 51 will be prevented from being thrown laterally by the action of said cutter to a position where they would be liable to be engaged and broken down by the machine; on the contrary such stalks will be guided over the arm 100, directly into engagement with the reel 82 to be thereby thrown into engagement with the cutting apparatus 90, being afterward disposed of as hereinbefore set forth.

The grain wheel 17 has been shown as being mounted on a spindle 104 extending from a slide 105 which is guided for vertical movement by guides 106 on the outer face of the box or receptacle 63. The slide 105 is vertically adjustable by means of a hand lever 107 with which it is connected by means of a link 108, said hand lever having a stop member 109 engaging a segment rack 110 whereby the parts will be maintained securely at various adjustments. It is evident that by this means the grain side of the machine may be vertically adjusted, as is customary in harvesters of various kinds.

From the foregoing description, taken in connection with the drawings hereto annexed, it will be seen that I have produced a simple and thoroughly efficient device which may be readily attached to and used in connection with the binding mechanism of any ordinary conventional harvester and binder, for the purpose of heading Kafir corn and the like and also cutting stalks, the latter being tied into bundles by the well known binding mechanism so that they may be conveniently saved. I thus provide at relatively small expense not only means for heading Kafir corn and the like, but also the means for saving the stalks, the nutritive qualities of which are well known and are constantly more highly appreciated. The construction of the improved apparatus is simple and of such a nature that it may be readily connected up with the binding mechanism of a harvester and binder without the use of the services of skilled mechanics.

Having thus described the invention what is claimed as new, is:—

1. In a machine of the class described, a tubular post, an extension member telescoping therein, means for supporting the extension member for oscillation at various adjustments, a driven shaft extending through the post and the extension member, a cutting apparatus mounted on the extension member and including a rotary cutter, and means for transmitting motion from the driven shaft to said cutter.

2. In a machine of the class described, a tubular post, a tubular extension member connected therewith for oscillation and for vertical adjustment, a driven shaft extending through the post and the extension member, a rocking frame associated with the extension member, a cutting apparatus carried by the rocking frame, and means for transmitting motion from the driven shaft to the cutting apparatus.

3. In a machine of the class described, a tubular member supported for oscillation and for vertical adjustment, said member having a yoke, a driven shaft extending through the tubular member, a rocking frame associated with the yoke and having oppositely extending arms, a cutting apparatus supported on the inner arm and including a movable cutter, and means for transmitting motion from the driven shaft to the movable cutter.

4. In a machine of the class described, a tubular member supported for oscillation and for vertical adjustment and having a terminal yoke, a driven shaft extending through the tubular member, a rocking frame associated with the yoke and having oppositely extending arms, one of which constitutes an operating lever, a rack segment supported on the yoke, a stop member associated with the operating lever and engaging the rack segment, a cutting apparatus supported on the other arm of the rocking frame and including a movable cutter, and means for transmitting motion from the driven shaft to the movable cutter.

5. In a machine of the class described, a tubular member supported for oscillation and for vertical adjustment and having a yoke at its upper end, a driven shaft extending through the tubular member, a rocking frame associated with the yoke and having a forwardly extending arm, means for tilting the rocking frame and for securing it at various adjustments, a cutting apparatus supported on the forwardly extending arm of the rocking frame and including a movable cutting member, and means for transmitting motion from the driven shaft to the movable cutting member.

6. In a machine of the class described, an oscillatory member, a rocking member connected therewith, a driven shaft extending through the oscillatory member, a cutting apparatus supported on the rocking member and including a rotary cutter deriving motion from the driven shaft, and a U-shaped guide supported adjacent to the rotary cutter and coöperating therewith.

7. In a machine of the class described, an oscillatory member, a rocking member connected therewith, a driven shaft extending through the oscillatory member, a cutting apparatus supported on the rocking member and including a rotary cutter deriving motion from the driven shaft, a U-shaped guide supported adjacent to the rotary cutter and coöperating therewith, an arcuate guide supported adjacent to the rotary cutting member, and an inclined chute adjacent to said guide.

8. In a machine of the class described, a vertically disposed tubular oscillatory member, a rocking frame associated therewith for tiltable movement in an approximately vertical plane, a driven shaft extending through the tubular oscillatory member, an arm extending forwardly from the rocking frame, a cutting apparatus supported on said arm and including a rotary cutter, means for transmitting motion from the driven shaft to the rotary cutter, a U-shaped stalk guide supported adjacent to the rotary cutter, an arcuate guard member and an inclined chute supported in spaced relation to the rotary cutter, and a stripping element supported in advance of the rotary cutter and having one end diverged laterally with respect thereto.

In testimony whereof I affix my signature in presence of two witnesses:

WILLIAM AMREIN.

Witnesses:
 WM. BAGGER,
 BENNETT S. JONES.